(12) United States Patent
Regev et al.

(10) Patent No.: US 6,772,256 B1
(45) Date of Patent: Aug. 3, 2004

(54) ROUTING ARBITER FOR DATA NETWORK SWITCHING

(75) Inventors: Zvi Regev, Woodland Hills, CA (US); Alon Regev, Woodland Hills, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/320,909

(22) Filed: May 27, 1999

Related U.S. Application Data (60) Provisional application No. 60/086,902, filed on May 27, 1998.

(51) Int. Cl.[7] .................. G06F 12/00; G06F 13/00; G06F 15/16
(52) U.S. Cl. ............... 710/240; 710/316; 710/317; 709/245
(58) Field of Search ................ 710/240, 241, 710/242, 268, 316–317; 370/411, 412, 413, 414, 416, 418, 419, 420, 421, 422, 423; 709/245

(56) References Cited

U.S. PATENT DOCUMENTS

| | | | | |
|---|---|---|---|---|
| 4,754,451 A | * | 6/1988 | Eng et al. | 370/60 |
| 4,866,701 A | * | 9/1989 | Giacopelli et al. | 370/60 |
| 4,899,334 A | * | 2/1990 | Shimizu | 370/60 |
| 5,179,552 A | * | 1/1993 | Chao | 370/60 |
| 5,179,558 A | * | 1/1993 | Thacker et al. | 370/94.3 |
| 5,724,352 A | * | 3/1998 | Clooman et al. | 370/395 |
| 5,761,440 A | * | 6/1998 | De Marco et al. | 709/245 |

* cited by examiner

*Primary Examiner*—Tim Vo
(74) *Attorney, Agent, or Firm*—Dickstein Shapiro Morin & Oshinsky LLP (57) ABSTRACT

An arbiter data networks switches is described which examines all pending routing requests simultaneously, and grants execution permission to any routable request which meets certain programmable priority requirements.

24 Claims, 7 Drawing Sheets

ROUTING ARBITER FOR DATA NETWORK SWITCHING

The present application is a non-provisional application of provisional application serial No. 60/086,902, filed May 27, 1998.

BACKGROUND OF THE INVENTION

An apparatus commonly known to persons skilled in the art of data communications as a data network switch, is used to interface between a plurality of network segments. The apparatus works in a way that allows a plurality of simultaneous independent data transactions on different network segments, one transaction on each segment, while concurrently enabling a plurality of data transmissions between segments whenever such transmissions are requested. A central routing controller receives routing requests from the plurality of segments and attempts to connect the requesting segment to the requested destination segment when the request is routable. A request is considered routable when both the requesting source segment and the requested destination segment are idle, which means neither is engaged in data communications with any other segment at the time of the route change. In the prior art, the requesting segments send their routing requests to a queue, which lines-up the requests and attempts to establish the requested route if both the requesting source and the requested destination are idle. In case a routing request of the first request in line is not readily available this request and all other subsequent requests in the queue must wait until the requested route becomes available. This case is called a Head of Line Blocked route case and is the most undesirable case as it delays all subsequent routing requests in the queue. The present invention describes a routing arbiter which optimizes the process of routing of available routes and minimizes Head of Line routing blockage.

The routing arbiter described herein maintains a list of all pending route requests and receives information of all idle sources and destinations. Whenever a request for routing exists when both the destination and the source are simultaneously idle, the arbiter grants permission to execute that request, where the criteria for such grant is not the order of the requests within the queue but rather a set of programmable priority parameters. The uniqueness of this invention is in the way it processes the pending requests. It does not do it on an individual basis, handling one request at a time, but instead processes all the pending requests simultaneously.

SUMMARY OF THE INVENTION

This invention describes a device intended to solve "Head of Line Blocking" problems associated with routing queues in computer data network switches. Such queues typically store all pending routing requests, and processes them in the order of their arrival. If the request at the head of the queue can not be processed and the requested routing cannot be granted because of a busy requested source or destination at the time of process, all other pending request cannot be processed until the head of the queue is cleared. All pending requests are processed simultaneously, thus there is no "Head of Line" in the queue. Instead the decision and the selection of the request to be granted at the time of processing is based on a programmable priority scheme. Further, all pending requests are compared simultaneously with all idle sources and destinations. A request is considered routable if both the requesting source and requested destination in that particular request match with an idle source and an idle destination. If more than one request is routable at the time of the processing, the routable request with the highest priority is granted. This priority scheme equates to a virtual prioritized queue. Several virtual queues can exist side by side. Priorities can be applied within each virtual queue and also between the queues. If desirable, more than one request may be granted in any single processing period. The process of examination of all the pending routing requests repeats itself in a cyclic fashion, once per each clock cycle.

DETAILED DESCRIPTION OF THE INVENTION

The circuit description is best understood in conjunction with FIGS. 1 through 7. The arbiter (9) receives Routing Request Commands (RRC) via down a route request bus (1), which is W bits wide, in the format shown in FIG. 2. The number of bits in each group and the total number of bits in the bus varies, depending on the number of ports in the network switch serviced by the Arbiter and other design parameters. In general the route request word is composed of six groups of bits: The first group is n bits wherein each bit used to indicates one requesting (source) port. Only one of the n bits in the group can be set within a single RRC. The second group is m bits wherein each bit indicates one of m requested (destinations) ports. Any number of bits out of the m bit in the group may be set within a single RRC. The third group of q1 bits is used to identify a particular message for which that RRC is issued. The fourth group of q2 bits includes a time stamp indicating the time of issuance of that routing request. The fifth group of q3 bit is used to assign a single or several priority levels and other processing information to that route request. The last group of q4 its constitutes a tag that indicates the validity of that route request.

Figure 1:
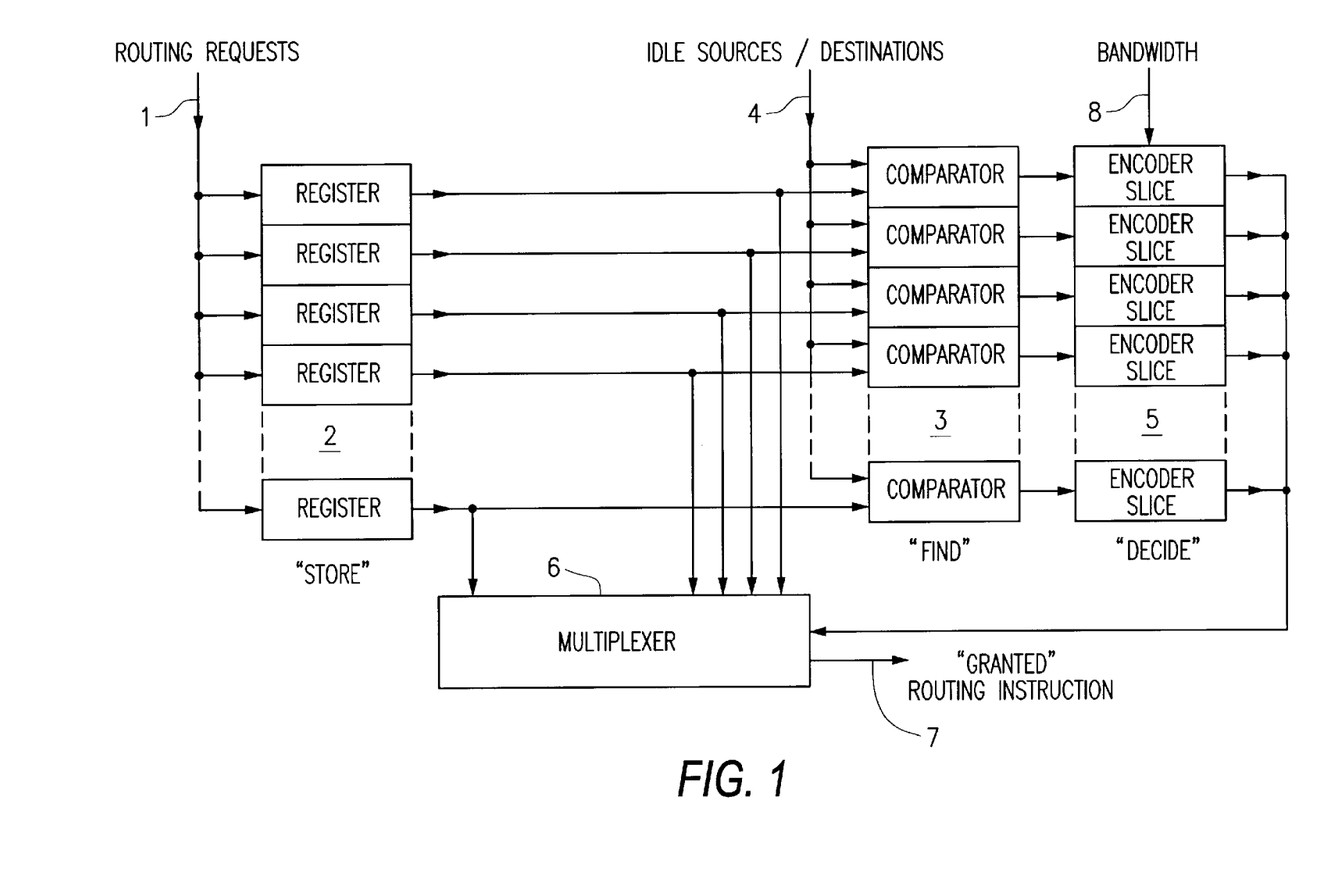
FIG. 1 is a block diagram of an arbiter according to the present invention.
Figure 2:
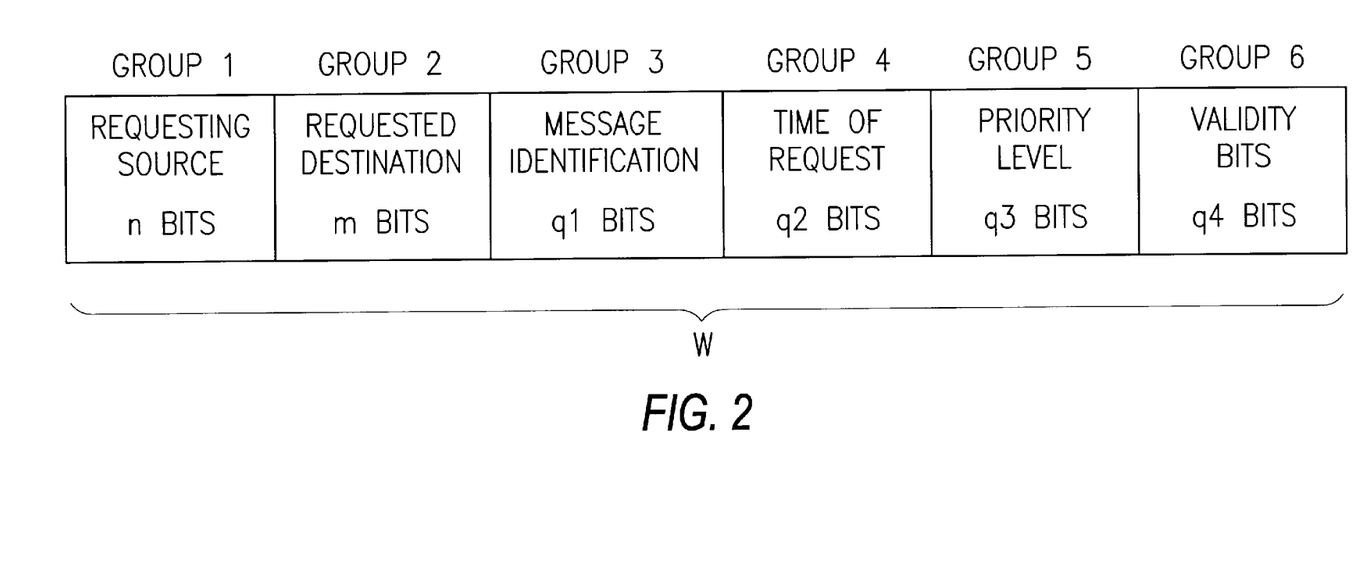
FIG. 2 is a typical routing request data format.
Figure 3:
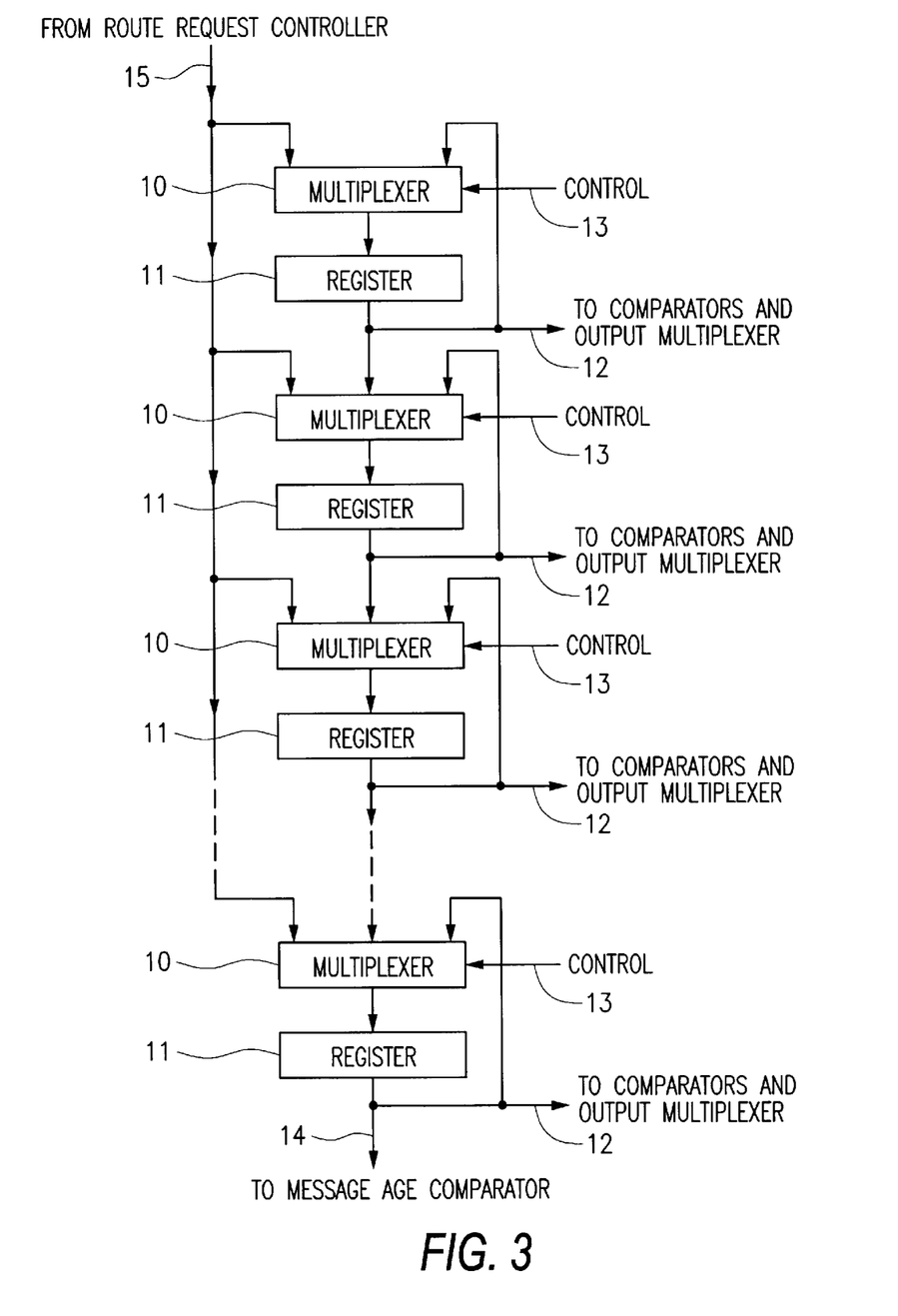
FIG. 3 is a conceptual block diagram of the arbiter's register stack.

The Routing Request Commands are stored in the order of arrival, in the register stack (2) which serves as a processing pool memory. FIG. 3 shows a detailed block diagram of the register stack (2). This register stack (2) is constructed such that received routing requests (15) get stored in the stack in an orderly fashion from the bottom up. The first request to arrive is placed in the bottom slice of the stack (2). When a second request arrives, it is placed in a slice just above the previous one. This method of storage arranges the received routing requests in the order of their arrival with the least recent ones at the bottom and the most recent ones on top. When a request is deemed routable, the multiplexer (6)

selects the data from the associated register, and that data is provided as the "granted" routing instruction (7). Consequently the register from which the granted routing instruction was read, is purged and data stored in all the stack slices above the purged slice are shifted down one location to fill up the void in the stack (2).

Figure 4:
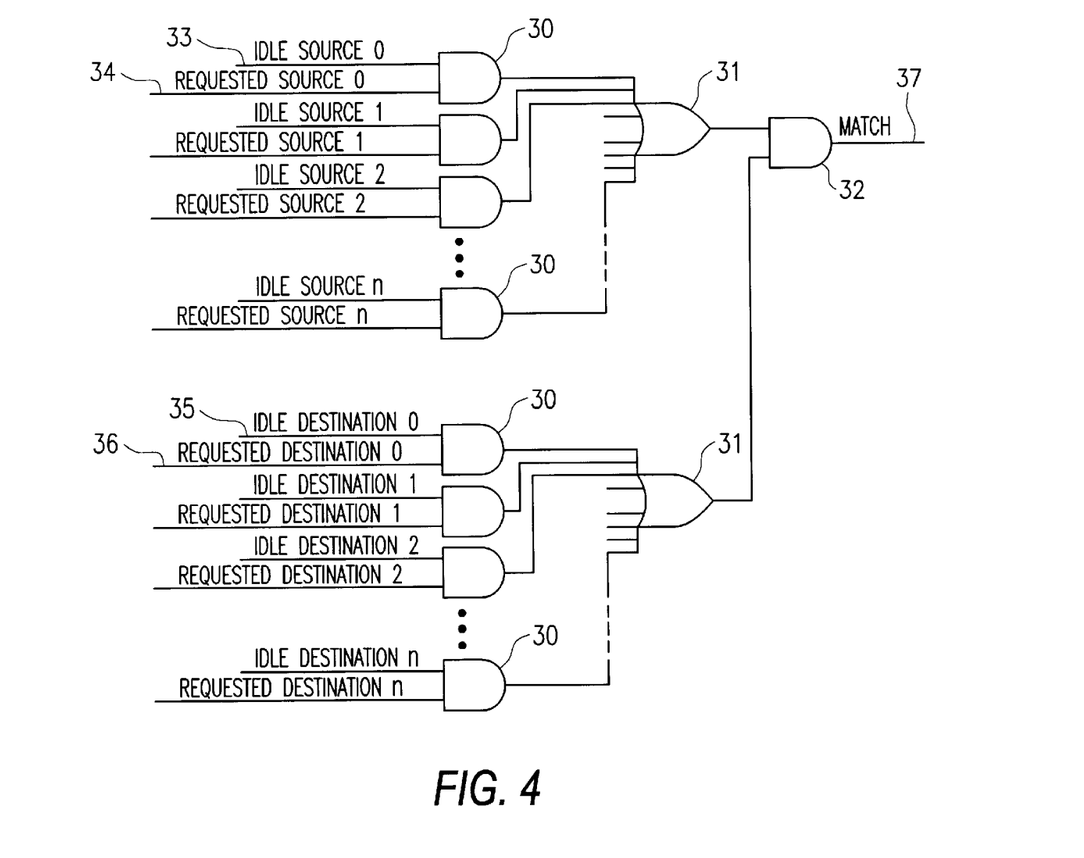
FIG. 4 is a logic circuit used in each arbiter slice to find a match between a pending request and available idle resources.

FIG. 4 shows the structure of the register stack (2). The stack has n slices, wherein each slice has a register (11) and a multiplexer (10). The register (11) and the multiplexer (10) are each W=(m+n+q1+q2+q3+q4) bits wide. This combination of register and multiplexer enables each slice to execute three modes of operation:

1. Receive and load data directly from the input bus (15).
2. Receive and load data from an adjacent slice to perform a SHIFT operation.
3. Hold the data stored in the register (11) unchanged.

The multiplexer (10) of each slice has its own control input (13), thus the modes of operation described above may be localized whereas part of the register stack (2) may be in the HOLD mode, another part in the SHIFT mode while another part may be in the LOAD mode.

Figures 5, 5A:
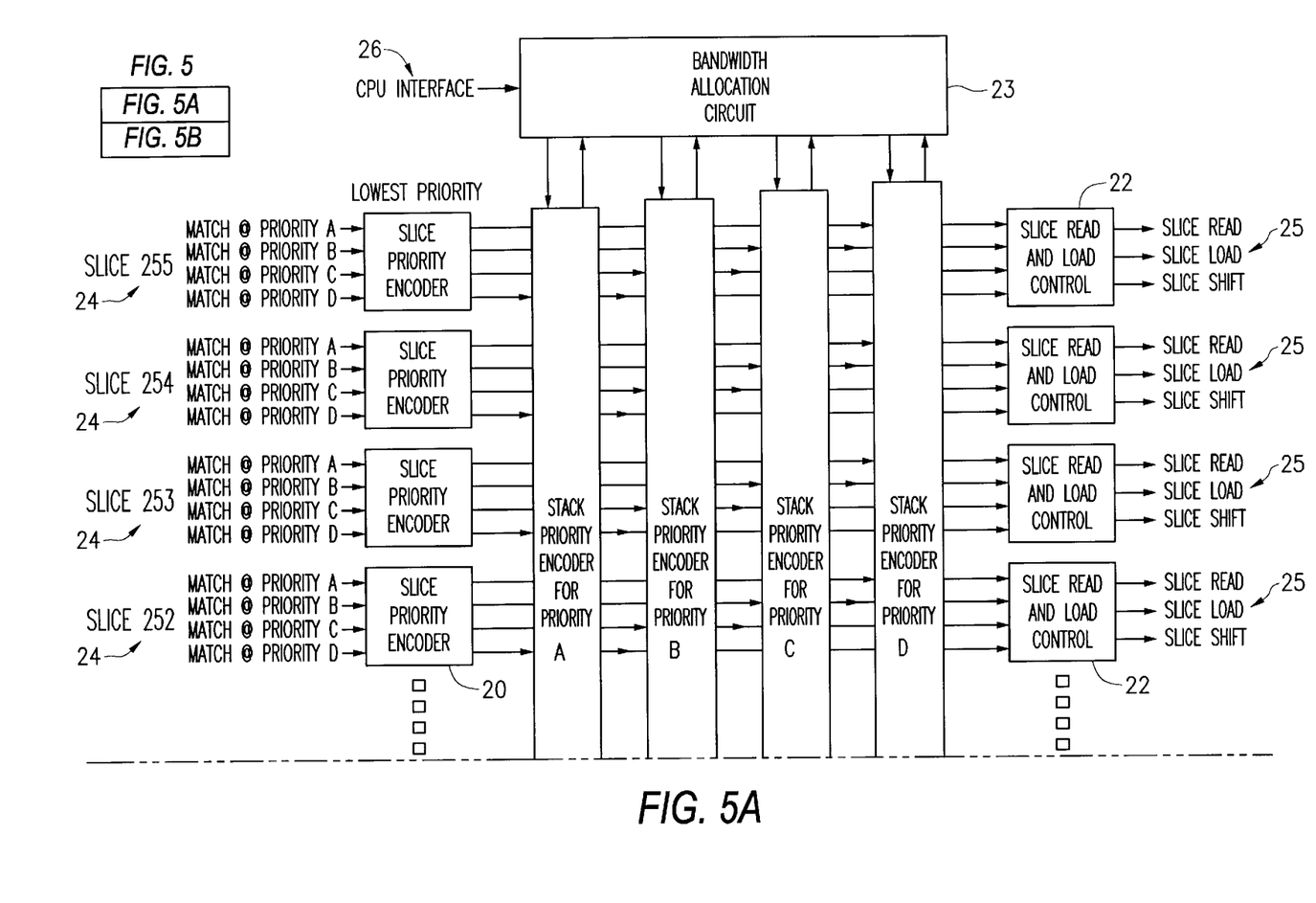
FIG. 5 is a conceptual block diagram of the priority determination, and the bandwidth allocation mechanism which controls the routing chances for the various virtual queues.
Figures 5, 5B:
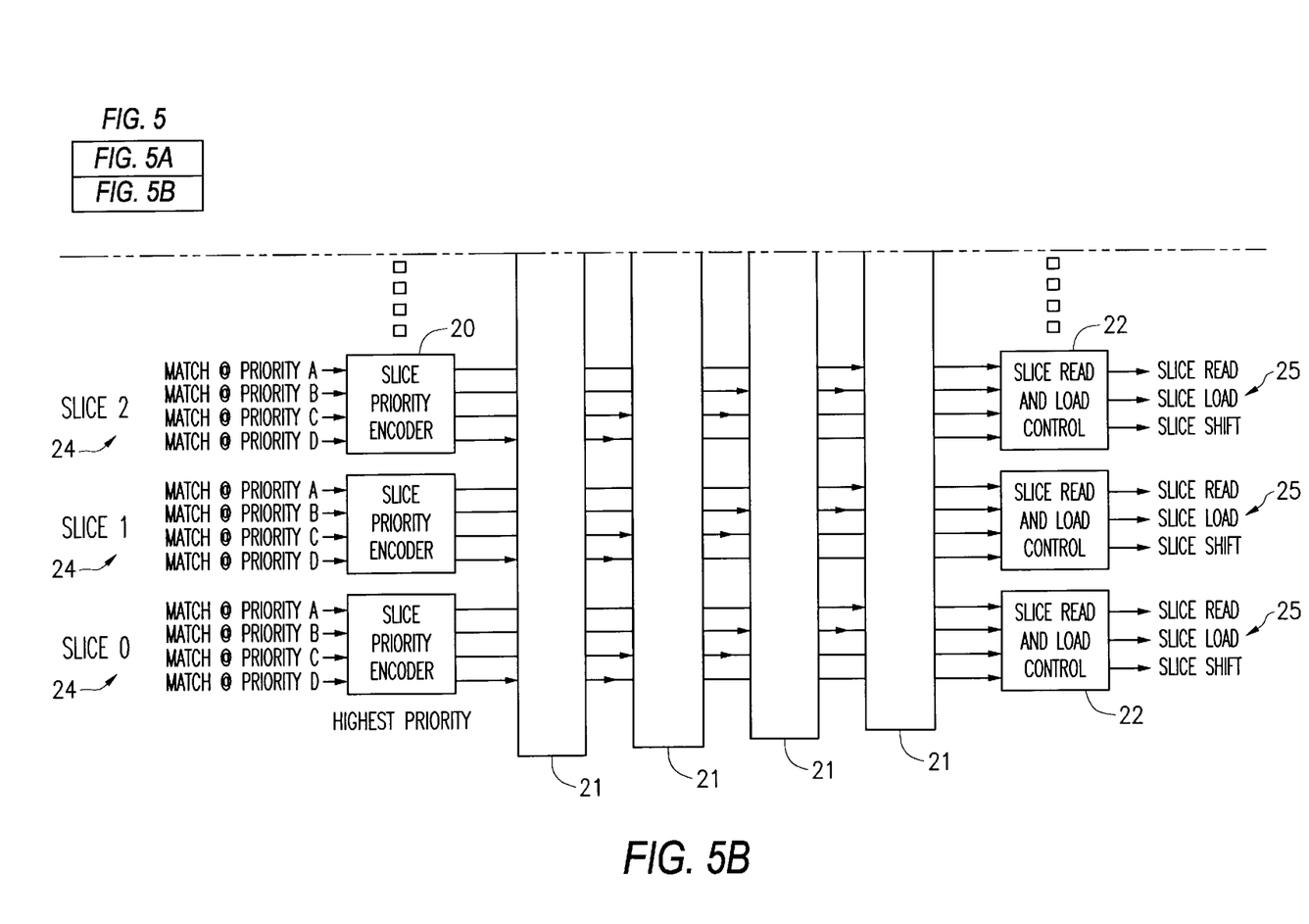
Figure 7:
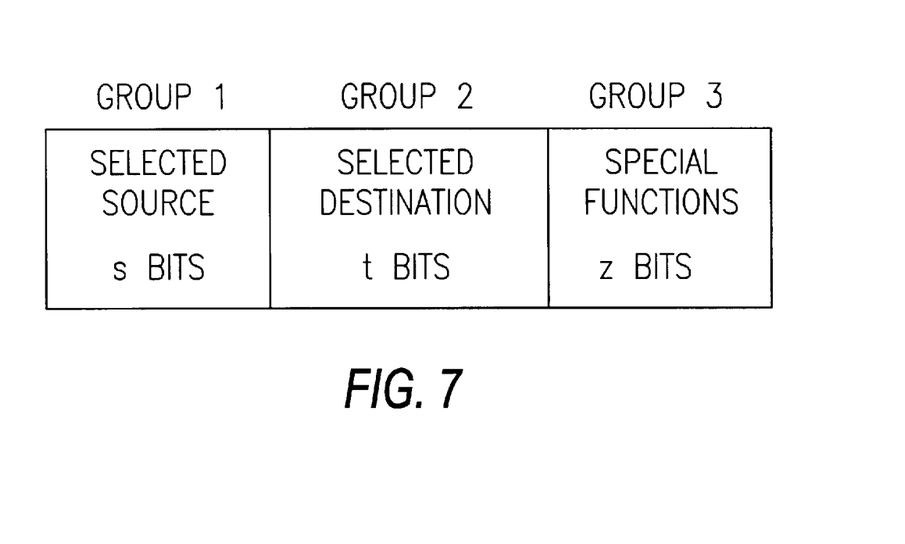
FIG. 7 is a typical output bus data format.

Each slice in the register stack (2) has an associated matching comparator in the comparator stack (3). Each comparator receives the requesting source and the requested destination data (bit groups n and m) from the associated register in the register stack (2). It also receives information on all the idle sources and destinations (4). The details of a typical comparator are shown in FIG. 4. In the comparator, two sets of AND gates (30) are used to find matches between requests and idle resources. In the first set, idle sources (33) are matched with requesting sources (34). A bit indicating an idle source is in the logic "1" state when that source is idle. Of all the bits indicating the requesting sources (33), only one bit may be at the logic "1" state in any single RRC. Therefore only one of the gates in this group of gates will have an output logic state of "1". In the second group of gates the idle destinations bits (35) are matched with requested destinations (36). In this group multiple matches can exist in any single RRC. The outputs of the AND gates (30) of each group are summed up by the OR gates (31), the output of which is applied to an AND gate (32). The output state of either OR gate (31) is logic "1" whenever any match exists in the AND gates (30) in front of them. The output of the AND gate (32) will be a logic "1" match (37) only if both the outputs of the OR gates (31) are logic "1". The result of this process is a MATCH output (37) only when a match is found between a requesting source and an idle source simultaneously with a match between a requested destination and an idle destination. The outputs of all the matching comparators in the comparator stack (3) are fed to the priority encoding stack (5), along with the q3 bits of the associated register in the register stack (2), which indicate the assigned priority of the matching request. The priority encoding stack.(5) also receives a bandwidth allocation instruction (8) to control the allocation of routing resources between the various virtual queues and assigned priority levels. The priority encoding stack like all of the arbiter is constructed in a slice form, one slice for each register (slice) in the register stack (2). FIG. 5 shows the details of the priority encoding stack (5). It depicts a typical case of four virtual queues (21) and 256 priority encoding slices but the actual number of queues and slices may vary. In the priority encoding stack (5), matching data (24) comes in from the associated comparator slices in the comparator stack (3). Each encoder slice in the priority encoding stack (5) determines the priority and the disposition of matches determined in the comparator stack (3) slice it is associated with. Each slice (22) in the priority encoding stack (5) makes the decision with regards to the routing request stored in the register stack (2) associated with it. The priority encoding stack (5) slice output (25) directly controls the multiplexer (11) in the corresponding register stack (2) slice via the control lines (13), as well as the selection and readout of the granted routing instructions and the purging of the corresponding register. The multiplexer (6) is also controlled by the priority encoding stack. It selects and delivers the routing instruction determined by the arbiter to the output buses (7). An output bus includes s bit to identify the source of the requested route, t bit to identify the selected rote destination, and z bits to specify special modes, instructions, or services derived from the q1 bits in the associated routing request, as shown in FIG. 7.

Figure 6:
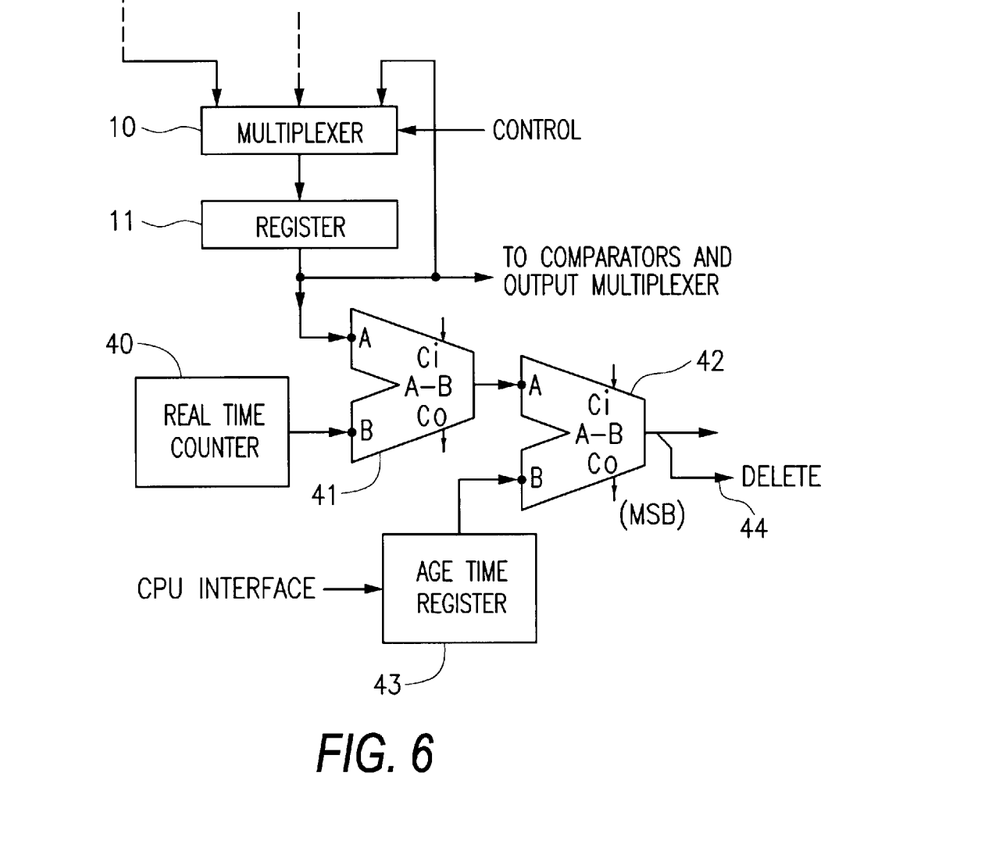
FIG. 6 depicts the method by which the age of pending routing requests is determined for the purpose of retirement.

Since routing requests in the queue are processed based on routability combined with assigned priorities, certain requests may end up staying in the register stack (2) for an excessive length of time may have to be deleted as "overdue" or "unroutable". In the way the register stack (2) is constructed, the most recent entry is always on top, and the least recent entry at the bottom of the stack. Therefore the bottom slice in the register stack (2) is equipped with a request age comparator as shown in FIG. 6. The real time counter (40) indicates the time at the instance of the observation. The subtractor (41) subtracts the time of issuance of the request stored in the register at the bottom of the stack (2), provided by the q2 bits in the register. The output of the subtractor (41) represents the duration of time the request had been waiting for processing known as the request age. The second subtractor (42) subtracts the request age generated by the first subtractor (41) from the programmable "retirement" age stored in the register (43). If the output of the subtractor (42) is a negative number (44), it indicates that the request stored in the register at the bottom of the stack (2) is over the age of retirement and is to be deleted. This causes the purging of the bottom slice register, and a subsequent shift down of all other slices in the stack.

We claim:

1. An apparatus for arbitrating access or services among a plurality of routing or service requests comprising:
    a) an input bus,
    b) a processing pool memory coupled to said input bus,
    c) a resource availability bus indicating resources available for routing and services,
    d) a matching processor coupled to said processing pool memory and said resource availability bus to determine matches between pending routing or service requests and available resources;
    e) a selection processor coupled to said matching processor to select from a plurality of matches between pending routing or service requests and available resources, the requests to be granted;
    f) at least one output bus coupled to said selection processor; and
    g) a priority encoder stack for assigning a priority value to each of said plurality of routing or service requests.

2. An apparatus as in claim 1 wherein the input bus is W bits wide, and carries W bits wide routing or service routing or service request commands, wherein n bits are assigned to identify one of a plurality of requesting agents, m bits are assigned to identify one of a plurality of requesting agents or services, q1 bits are assigned to identify a message or a type of service requested, q3 bits are assigned to identify a priority level of the requested route or service, q2 bit bits are assigned to identify a sequential position or time tag associated with the requested route or service, and q4 bits are assigned to other logic functions of the route or service request.

3. The apparatus as in claim 1 whereas wherein the processing pool memory comprises a stack of registers and wherein each said register is adapted to receive and store a routing or service request command via the input bus and further wherein such commands are arranged within the register stack in successive order without gaps in the order of their arrival and further wherein the content of each register in the register stack may be read out to an output bus and wherein upon such readout the said registers are purged and all registers storing commands of a less recent time tag are shifted to fill up a purged registers location.

4. An apparatus as in claim 1 wherein the resource bus comprises:
   n bits for the requesting source agents, one bit for each requesting agent, wherein a bit associated with a requesting agent is in the active state while the associated requesting agent is IDLE, and wherein said bit is in the inactive state while the associated requesting agent is not IDLE:
   m bits for the destination or service agents, one bit for each destination or service agent, wherein a bit associated with a requested destination or service agent is in the active state while the associated agent is IDLE, and wherein such bit is in the inactive state while the associated agent is not IDLE.

5. The apparatus as in claim 1 wherein the selection processor comprises:
   logic elements which operate to simultaneously execute a selection algorithm wherein at least one match is selected, and further wherein request commands stored in registers of the register stack associated with the selected matches are granted, and further wherein a plurality of grant command output buses indicate the grants of said requests.

6. The apparatus as in claim 1 wherein each of the at least one output buses includes s bits indicating a source end of a granted route, t bits indicating a destination end of a granted route, and z bits indicating a granted message or service identity.

7. An apparatus as in claim 1 wherein the matching processor comprises a plurality of comparator processors, in which n and m bits of a pending request command in the register stack are simultaneously compared bit by bit with the n and m bits of the resources availability bus to determine an overall truth condition of a match for each one of the pending requests.

8. An apparatus as in claim 1 wherein the selection processor operates such that there is at least one selection category and within each selection category the selection processor selects a highest priority match, from among a plurality of matches detected by the matching processor, and wherein such priority is determined by at least one of i) a time tag assigned to the request command in the register stack, ii) a priority level assigned to each request command by the requesting agent, and iii) a priority level based on a sequential index of one of the registers within the register stack.

9. An apparatus as in claim 1 wherein overdue requests are discarded by assigning a time tag of a real time clock to each request command in the stack register, and wherein the time tag of the highest priority value register in the register stack is compared to a continuous real time clock such that if the time difference between the real time and the time tag of the highest priority value register in the register stack is larger than a predetermined value, the content of that register is considered over due and is discarded.

10. An apparatus as in claim 1 wherein upon receipt of a command from the selection processor, the content of the selected register in the register stack is transferred to the output bus.

11. An apparatus as in claim 1 wherein a plurality of registers in a register stack are read simultaneously to a corresponding plurality of said output buses, each indicating a requesting agent, a requested destination agent, and a message or service identification.

12. An apparatus as in claim 1 wherein a register stack is constructed in a way that guarantees that routing requests are always stored in the stack in an order such the least recently received routing request is stored at a bottom end of the stack and wherein more recent requests are stored in locations further away from the bottom and the operation within the stack is set such that under all conditions the order in which older requests are closest to the bottom of the stack and newer requests are closer to the top of the stack.

13. An apparatus as in claim 1 wherein a selection algorithm selects high priority matches in a priority encoding circuit, and wherein one method of determining the priority is determined by an age of said requests, and further wherein the age of each of said requests is determined by the location of the said request within the register stack, and the distance of that location from the bottom of the stack.

14. An apparatus as in claim 2 wherein, each one of the n bits accounts for a corresponding one of the requesting agents and requested destination agents, and further wherein the requesting agents and/or the requested destinations are identified by having the associated ones of the n bits set to the active state, and all other ones of the n bits set to the inactive state.

15. The apparatus as in claim 3 wherein the matching processor comprises:
   a plurality of logic elements which operate to compare bits of one of said stack registers with associated bits of the resource availability bus to detect matches between active bits in the register and active bits in the resource availability bus, said logic elements operating to detect match when one bit out of n bits designating a requesting agent in one of said registers is active and an associated bit in the available resources bus is active and wherein one bit out of m bits designating a requested destination or service agent in one of said registers is active and an associated bit in the available resources bus is active, said comparison being executed simultaneously on all the registers in the register stack and further wherein the matching processor outputs identify the plurality of registers in the register stack for which said matches have been established.

16. The apparatus as in claim 3 wherein the register stack comprises:
   a plurality of registers each including a plurality of flip-flops, there being one flip-flop per bit and wherein:
   n bits are assigned to identify the requesting agents,
   m bits are assigned to identify the requested destinations or services,
   q1 bits are assigned to identify a message or the type of service requested,
   q2 bit bits are assigned to identify the sequential position or time tag associated with the requested route or service,
   q3 bits are assigned to identify the priority level of the requested route or service,
   q4 bits are assigned to designate at least one logic function to the route or service request, and further wherein each register is adapted to hold presently stored data, read in data from a common input bus, and read in data from an output of an adjacent one of said registers.

17. The apparatus as in claim 3 wherein the output of each register in the register stack is coupled to at least one multiplexer such that selected bits content of each register in the stack is capable of being coupled to any of said at least one output bus.

18. An apparatus as in claim 7 wherein the matching processor further operates to define a match between a requesting agent bit in a request command and the availability of the requesting agent bit in the resource availability bus, and a destination agent bit in the request command and the availability of the destination agent bit in the resources availability bus; and the requesting priority bit in the request command and the priority bit assigned to the specific iteration cycle in the resources availability bus.

19. A method for arbitrating access or services among a plurality of routing or service requests comprising the steps of:
   a) receiving a plurality of service or routing path requests at an input of a processing pool memory;
   b) storing said plurality of service or routing path requests in said processing pool memory in an orderly fashion based on an order of arrival of said requests;
   c) assigning a priority to each of said plurality of service or routing path requests;
   d) receiving said plurality of service or routing path requests from said processing pool memory at an input port of a comparator; and
   e) operating said comparator to grant access or services among said plurality of routing or service requests based on an output of said comparator and the priority of said routing or service request.

20. A method for arbitrating access or services among a plurality of routing or service requests as defined in claim 19 wherein said storing said plurality of service or routing path requests in said processing pool memory in an orderly fashion based on an order of arrival of said requests comprises:
   storing said plurality of service or routing path requests in said processing pool memory in a bottom-up order based on said order of arrival.

21. A method for arbitrating access or services among a plurality of routing or service requests as defined in claim 19 wherein said storing said plurality of service or routing path requests in said processing pool memory in an orderly fashion based on an order of arrival of said requests comprises:
   storing said plurality of service or routing path requests in said processing pool memory in a top-down order based on said order of arrival.

22. A method for arbitrating access or services among a plurality of routing or service requests comprising the steps of:

operating a processing pool memory during a first time interval, said processing pool memory including a plurality of slices, said processing pool memory adapted to hold a plurality of service or routing path requests, said operating including one of:
   a) receiving an unprocessed service or routing path request directly from an input bus;
   b) shifting a service or routing path request from one to another of said plurality of slices; and
   c) holding a service or routing path request unchanged in said processing pool memory;

operating a comparator during a second time interval so as to grant a service or routing path request received at said comparator from said processing pool memory; and deleting said service or routing path request from said processing pool memory based on the time said service or routing path request is held in said processing pool.

23. A method for arbitrating access or services among a plurality of routing or service requests comprising the steps of:
   a) receiving a first plurality of unprocessed service or routing path requests at an input of a processing pool memory;
   b) holding both said first plurality of unprocessed service or routing path requests and a second plurality of previously processed service or routing path requests within said processing pool memory;
   c) concurrently processing a third plurality of service or routing path requests including a request of said first plurality and a request of said second plurality of said requests; and
   d) based on an availability of routing resources for such requested routes or services and a priority assigned to each request, granting a route or a service to a pending request of said third plurality.

24. An apparatus for arbitrating access or services among a plurality of routing or service requests comprising:
   a) an input bus;
   b) a processing pool memory configured in a stack memory structure coupled to said input bus;
   c) a resource availability bus indicating resources available for routing and services;
   d) a matching processor coupled to said processing pool memory and said resource availability bus to determine matches between pending routing or service requests and available resources;
   e) a selection processor coupled to said matching processor to select from a plurality of matches between pending routing or service requests and available resources, the requests to be granted; and
   f) at least one output bus coupled to said selection processor.

* * * * *